United States Patent
Jaeger et al.

(10) Patent No.: US 8,376,669 B2
(45) Date of Patent: Feb. 19, 2013

(54) DRILL, A DRILL ASSEMBLY, AND A TOOL HEAD FOR A CUTTING TOOL

(75) Inventors: Horst Manfred Jaeger, Nürnberg (DE); Peter Karl Mergenthaler, Markt Bibart (DE); Berthold Heinrich Zeug, Fürth (DE)

(73) Assignee: Kennametal Inc., Latrobe, PA (US)

( * ) Notice: Subject to any disclaimer, the term of this patent is extended or adjusted under 35 U.S.C. 154(b) by 1152 days.

(21) Appl. No.: 12/211,479

(22) Filed: Sep. 16, 2008

(65) Prior Publication Data

US 2009/0044986 A1 Feb. 19, 2009

Related U.S. Application Data

(63) Continuation-in-part of application No. PCT/EP2007/002313, filed on Mar. 16, 2007.

(30) Foreign Application Priority Data

Mar. 17, 2006 (DE) .......................... 10 2006 012 382

(51) Int. Cl.
*B23B 51/02* (2006.01)
(52) U.S. Cl. ......... 408/231; 408/226; 408/713; 408/233
(58) Field of Classification Search .................. 408/226, 408/231, 233, 713, 59, 57
See application file for complete search history.

(56) References Cited

U.S. PATENT DOCUMENTS

| 1,461,548 | A | * | 7/1923 | West .................................. 279/87 |
| 2,158,120 | A | | 5/1939 | Hirschberg |
| 3,304,816 | A | * | 2/1967 | Galorneau .................... 408/226 |
| 3,595,327 | A | | 7/1971 | Self |
| 3,776,656 | A | * | 12/1973 | Benjamin ..................... 408/233 |
| 4,591,302 | A | * | 5/1986 | Lovendahl .................... 408/188 |
| 4,950,108 | A | * | 8/1990 | Roos ................................ 408/59 |
| 5,800,098 | A | * | 9/1998 | Satran et al. .................... 407/31 |
| 5,957,635 | A | * | 9/1999 | Nuzzi et al. ................... 408/231 |
| 6,012,881 | A | * | 1/2000 | Scheer .......................... 408/227 |

(Continued)

FOREIGN PATENT DOCUMENTS

| EP | 0 441 302 | 8/1991 |
| EP | 0 742 065 | 11/1996 |

(Continued)

OTHER PUBLICATIONS

International Search Report PCT/EP2007/002313 and English translation thereof.

(Continued)

*Primary Examiner* — Daniel Howell
*Assistant Examiner* — Paul M Janeski
(74) *Attorney, Agent, or Firm* — Larry R. Meenan, Esq.

(57) ABSTRACT

A drill includes a tool body having a fluted portion having a second end and a tool head portion, having a cutting tip and at least one cutting edge, removably connected to the second end of the fluted portion. The fluted portion includes a receiving pocket disposed in the second end and is defined by a peripheral side wall extending about the periphery of the receiving pocket. The tool head portion includes a driving projection configured to be inserted into the receiving pocket. The driving projection and receiving pocket have corresponding elongated, curvilinear, dog-bone shapes. The driving projection includes a first end portion, a second end portion, and a central portion disposed between connecting the first end portion and the second end portion. The first end portion and the second end portion each have a width that is substantially greater than a width of the central portion.

16 Claims, 7 Drawing Sheets

U.S. PATENT DOCUMENTS

| | | | |
|---|---|---|---|
| 6,276,879 B1 * | 8/2001 | Hecht | 409/234 |
| 6,481,938 B2 * | 11/2002 | Widin | 408/226 |
| 6,582,164 B1 * | 6/2003 | McCormick | 408/226 |
| 7,467,915 B2 * | 12/2008 | de Souza, Filho | 408/231 |
| 2003/0219321 A1 * | 11/2003 | Borschert et al. | 408/230 |

FOREIGN PATENT DOCUMENTS

| | | |
|---|---|---|
| EP | 0 947 662 | 10/1999 |
| EP | 1 533 061 | 5/2005 |
| GB | 2 123 523 | 2/1984 |
| JP | 11-500967 | 1/1999 |
| JP | 2003-291014 A | 10/2003 |
| JP | 2003291017 A * | 10/2003 |
| JP | 2011136415 A * | 7/2011 |
| WO | WO 96/11079 | 4/1996 |
| WO | WO 00/09282 | 2/2000 |
| WO | WO 02/090027 | 11/2002 |
| WO | WO 03/097282 | 11/2003 |
| WO | WO 2004/087355 | 10/2004 |

OTHER PUBLICATIONS

Japanese Patent Office, "Notice of Reasons for Rejection", Jan. 31, 2012, 8 pp.

* cited by examiner

Section B-B

Section B-B

US 8,376,669 B2

DRILL, A DRILL ASSEMBLY, AND A TOOL HEAD FOR A CUTTING TOOL

CONTINUING APPLICATION DATA

This application is a Continuation-In-Part application of International Patent Application No. PCT/2007/002313, filed on Mar. 16, 2007, which claims priority from Federal Republic of Germany Patent Application No. 10 2006 012 382.4, filed on Mar. 17, 2006. International Patent Application No. PCT/2007/002313 was pending as of the filing date of this application. The United States was an elected state in International Patent Application No. PCT/2007/002313.

BACKGROUND

1. Technical Field

This application relates to a drilling tool with a drilling member and a tool head exchangeably fixed thereon by means of a driving connector formed on the front-face end, the driving connector comprising a driving adaptor and a driving web extending over the tool center and engaging the driving adaptor. This application also relates to a tool head for such a drilling tool.

2. Background Information

Background information is for informational purposes only and does not necessarily admit that subsequently mentioned information and publications are prior art.

Such a drilling tool is disclosed in WO 2004/087355 A1. The drilling member includes, as a driving adaptor, a slot located on the front-face end, extending over the entire drilling-member diameter and laterally defined by two driving tangs. On the drilling head, the driving web also extends over the entire diameter range. The driving web includes an additional centering pin disposed centrally in its middle. The drilling head is fixed on the drilling member by means of radially oriented securing screws.

During the machining operation, the drilling tool is clamped by a clamping shank adjacent to the drilling member in a machine tool driving the drilling tool. The arising torques have to be transmitted via the driving connector. The high torques entail the risk that the driving tangs on the drilling member are resiliently expanded. Due to the radially oriented securing screws, there is an axial gap between the drilling member and the drilling head, which in operation may cause problems with the evacuation of the chips. In addition, the drilling member is weakened by the radial securing screws passed through the driving tangs. Finally, the centering pin arranged in the center weakens the core cross-section of the drilling-member adaptor.

At least one embodiment of the application is based on the task to provide a drilling tool with an exchangeable tool head, which is suitable for very high stresses.

OBJECT OR OBJECTS

The task is solved according to at least one possible embodiment of a drilling tool disclosed herein. In accordance with at least one possible embodiment, the drilling tool comprises a drilling member and a tool head exchangeably fixed thereon by means of a driving connector formed on the front-face end, the driving connector being formed by a driving web, arranged in at least one embodiment on the tool head on the latter's end face facing towards the drilling member, as well as by a receiving pocket formed on the front-face end of the drilling member and including a peripheral web for receiving the driving web along its complete periphery. Therefore, on the end face of the drilling member, there is a peripheral web, formed, for example, in the manner of an oval, which completely surrounds the driving web in the manner of a pocket. This measure minimizes or restricts the formation of two separate driving tangs on the drilling member. Due to the peripheral design of the web, the torques to be transmitted are completely led into the peripheral web, without the risk of a resilient expansion of the driving adaptor.

SUMMARY

According to at least one possible embodiment, the driving web is surrounded by a contact face extending along the complete periphery and tightly resting on a corresponding contact face of the base body, extending along the periphery of the receiving pocket. The contact face is plane and extends normal to the axial direction. Alternatively to the plane design, the contact face is curved, for example in the manner of an envelope of cone. Therefore, the driving web is designed altogether corresponding to the receiving pocket and extends essentially only or substantially only over a partial area of the diameter. The fact that, in operation, the contact faces of the drilling member and of the tool head tightly rest on each other promotes a gap-free axial seating of the drill head on the drilling member. This reduces, on the one hand, the risk of problems of chip evacuation. On the other hand, the tight plane seating enables the introduction of coolant from the drilling member into the tool head through corresponding coolant channels passing through the contact faces.

According to at least one possible embodiment, the width of the driving web increases in direction towards its margin areas. Therefore, the web width is smallest in the drilling center, so that the core cross-section of the drilling-member adaptor is weakened very little. At the same time, there is sufficient space in the drilling center for the design of the peripheral web of the receiving pocket. At the same time, the increase of the width in direction towards the margin areas of the driving web, spaced from the drilling center, results in the driving web being reinforced in the areas in which the high torques have to be transmitted. Another advantage of the increasing web width lies in the fact that this measure provides a radial centering.

For this purpose, the side wall of the driving web, in accordance with at least one possible embodiment, may be curved in a radial direction. In this way, a force acting upon the driving web in the direction of rotation is divided, among others, into a radial force component. In a symmetric embodiment, the occurring radial forces act in opposite directions and, therefore, result in an automatic radial self-centering.

According to another possible embodiment, the tool head is fixed on the drilling member by screws oriented in axial direction. Therefore, the peripheral web of the receiving pocket is not weakened through radially arranged screws. According to at least one possible embodiment, the screws are passed through margin areas of the driving web spaced from the drilling center and screwed into a pocket bottom of the receiving pocket. As the screws are passed through the thicker margin areas and are, furthermore, screwed into the pocket bottom at a distance from the core cross-section, both the weakening of the driving web and the weakening of the drilling-member adaptor is low and has been shifted to uncritical areas.

According to at least one possible embodiment, the screw axis is offset relative to a drill-hole axis of a drill-hole, through which the screw is passed in the tool head, said offset being chosen such that the driving web is clamped against the peripheral web of the receiving pocket. Therefore, the offset presses the driving web against the peripheral web, so that a play-free bearing is promoted or essentially guaranteed. The offset is chosen such that the driving web is pressed, in the direction of rotation, against the peripheral web, such as against a driving face of the receiving pocket.

Supplementarily or alternatively thereto, the peripheral side wall of the driving web as well as the peripheral side wall of the peripheral web are designed, at least in partial areas, in such a way that they form together a back-grip. That means that the side walls of the driving web as well as of the peripheral web are formed in partial areas with a corresponding inclination to each other or in a step-like manner. What is meant by inclined design is an inclination at an angle to the axial direction. Step-like design is a design in which the side wall includes a step. Furthermore, the back-grip is formed such that the driving web is clamped against the receiving pocket in axial and/or in radial or in rotational direction. For this purpose, the driving web and the peripheral web engage each other, for example in the manner of a dovetail or a bayonet joint. To form this dovetail or bayonet joint, the driving web and receiving pocket are slightly rotated relative to each other during installation, i.e. they have sufficient play for the installation. This joint is of a self-locking design, so that the dovetail or bayonet joint will not be released during the drilling operation. The design of the back-grip also provides an axial locking of the tool head in the receiving pocket. In accordance with at least one possible embodiment, according to which also an axial clamping force is exerted, the two contact faces of the tool head and of the drilling member are clamped against each other.

To promote a seating of the driving web in the receiving pocket with optimum fit, the driving web has in at least one possible embodiment an overmeasure relative to the receiving pocket, at least in partial areas. Insertion bevels are provided on each end face for the installation. The overmeasure causes a slight resilient expansion of the peripheral web of the receiving pocket, so that the driving web is also held in the receiving pocket by friction, forming a press fit. Alternatively thereto, it is possible to provide an installation play relative to the receiving pocket, to enable a relatively easy installation of the tool head in the drilling member.

To enable a relatively precise or secure press fit between the driving web and the receiving pocket, it is, furthermore, provided in at least one possible embodiment that the side walls of the driving web and/or of the receiving pocket are designed with a conical shape in axial direction, at least in partial areas. The side wall is, therefore, slightly inclined to the axial direction. Upon tightening of the fastening screws, the driving web is pulled into the receiving pocket, the conical side walls being pressed against each other.

To promote a torsion-safe arrangement, an asymmetric design of the driving web is provided in at least one possible embodiment.

The object may further be solved according to at least one possible embodiment of a tool head for such a drilling tool as described herein. The advantages and possible embodiments mentioned with regard to the drilling tool can analogously also be applied to the tool head. The tool head includes in at least one possible embodiment a central drill-point insert and exchangeable cutting inserts, such as indexable inserts, arranged on both sides thereof. A drilling head of such a design is cost-advantageous in operation, due to the use of the exchangeable cutting inserts and allows very high cutting speed as well as a high feed rate.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Some possible embodiments will be explained in detail in the following by means of the figures, in which, in each case in a schematic representation.

In the figures, parts having the same effect are marked with the same reference numbers.

DESCRIPTION OF EMBODIMENT OR EMBODIMENTS

Figure 1:
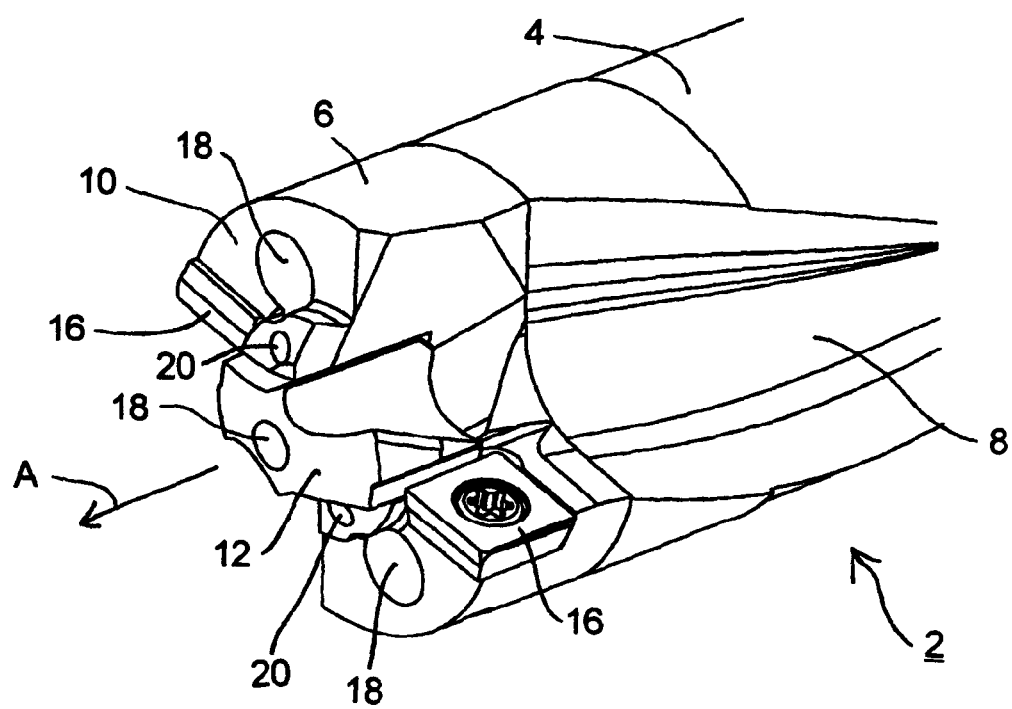
FIG. 1 is a perspective partial view of a drilling tool with a drilling head exchangeably fixed on a drilling member.

The drilling tool 2 extending in axial direction A according to FIG. 1 comprises a drilling member 4, on the front end face of which a drilling head 6 is exchangeably fixed. What is meant by drilling member 4 is in general the partial area of the tool, which during the machining operation usually engages the workpiece to be machined at least still in part, serving, for example, for chip evacuation or also performing a cutting function. In the embodiment shown, the drilling member 4 includes two helical flutes 8 arranged opposite each other, for chip evacuation. These chip flutes verge smoothly into opposite flute areas of the drilling head 6. On its rear end, not shown here in detail, the drilling member 4 has a clamping shank with which it can be clamped in a machine tool.

The drilling head 6 is of a multipiece design and includes a base body 10, in the center of which a drill-point insert 12 is exchangeably fixed by means of a screw. The drill-point insert 12 constitutes a so-called pilot drill. In radial direction, at the side of the drill-point insert 12, indexable inserts 16 are exchangeably fixed on the base body 10. In opposite margin areas of the base body 10, drill-holes 18 extending in axial direction A are formed in the end face, through which the screws 14 (FIG. 2) for fixing the drill head 6 on the drilling member 4 are passed. Likewise, a drill-hole 18 runs centrally through the drill-point insert 12. Furthermore, the drill-point insert 12 includes in its margin areas two opposite coolant exits 20 constituting the end of coolant channels 22 (FIG. 2) running through the drilling head 6.

It is desirable for such a drilling tool with exchangeable drilling head 6 to have a secure and reliable torque transmission from the drilling member 4 to the drilling head 6. For example, when using a drilling head 6 as shown in FIG. 1, usually very high cutting speeds and very high feed rates are adjusted, so that the drilling head 6 is subjected to very high stress and absorbs very high forces. Such high forces and stresses require a sufficiently stable execution of the driving connector between drilling head 6 and drilling member 4. Furthermore, a smooth transition between drilling head 6 and drilling member 4 is desirable for an optimum chip evacuation.

Figure 2:
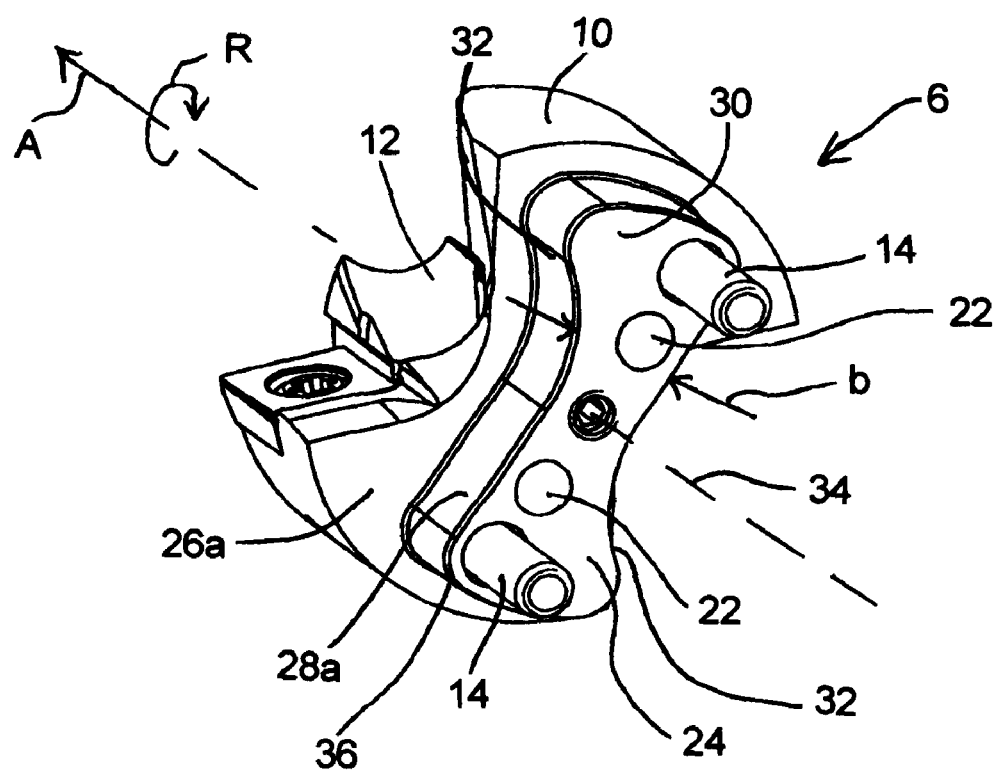
FIG. 2 is a perspective view of the drilling head according to FIG. 1, of the end face facing towards the drilling member, a driving web being arranged on said end face.
Figure 3:
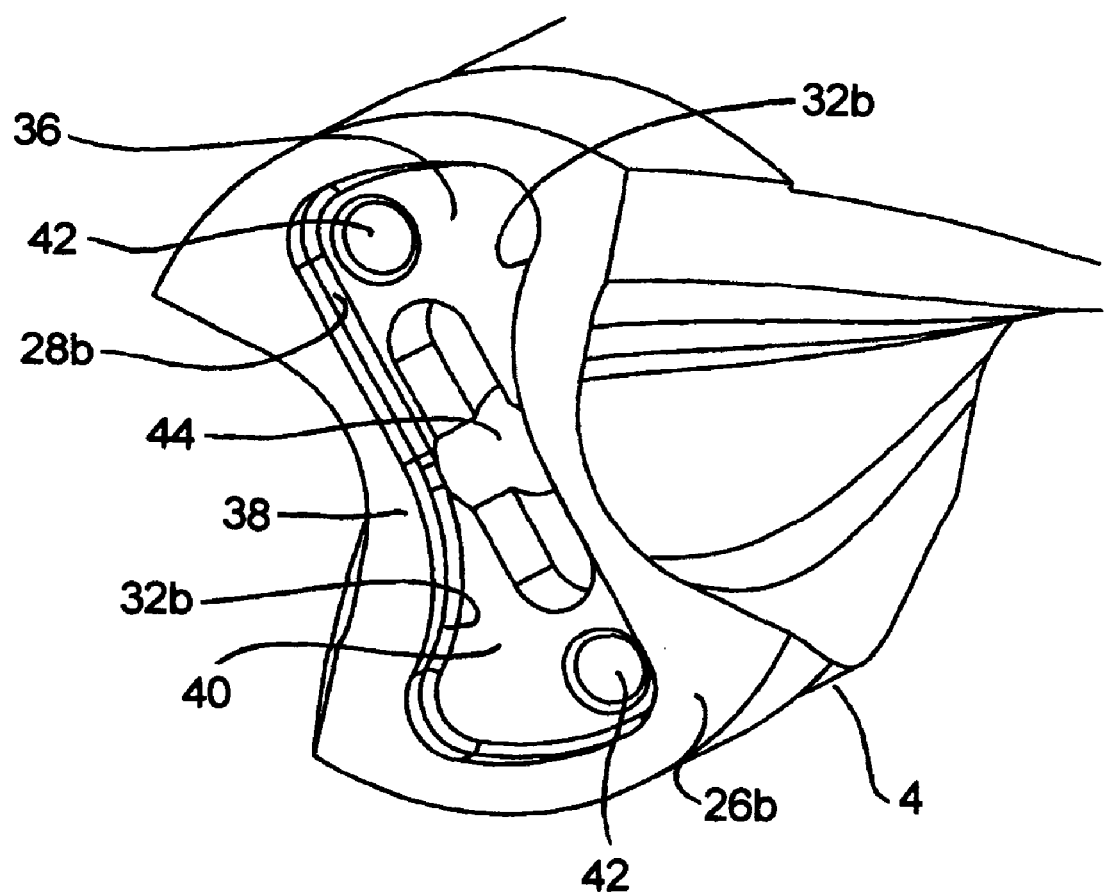
FIGS. 3 and 4 are perspective views of the front end face of the drilling-member with the receiving pocket.
Figure 4:
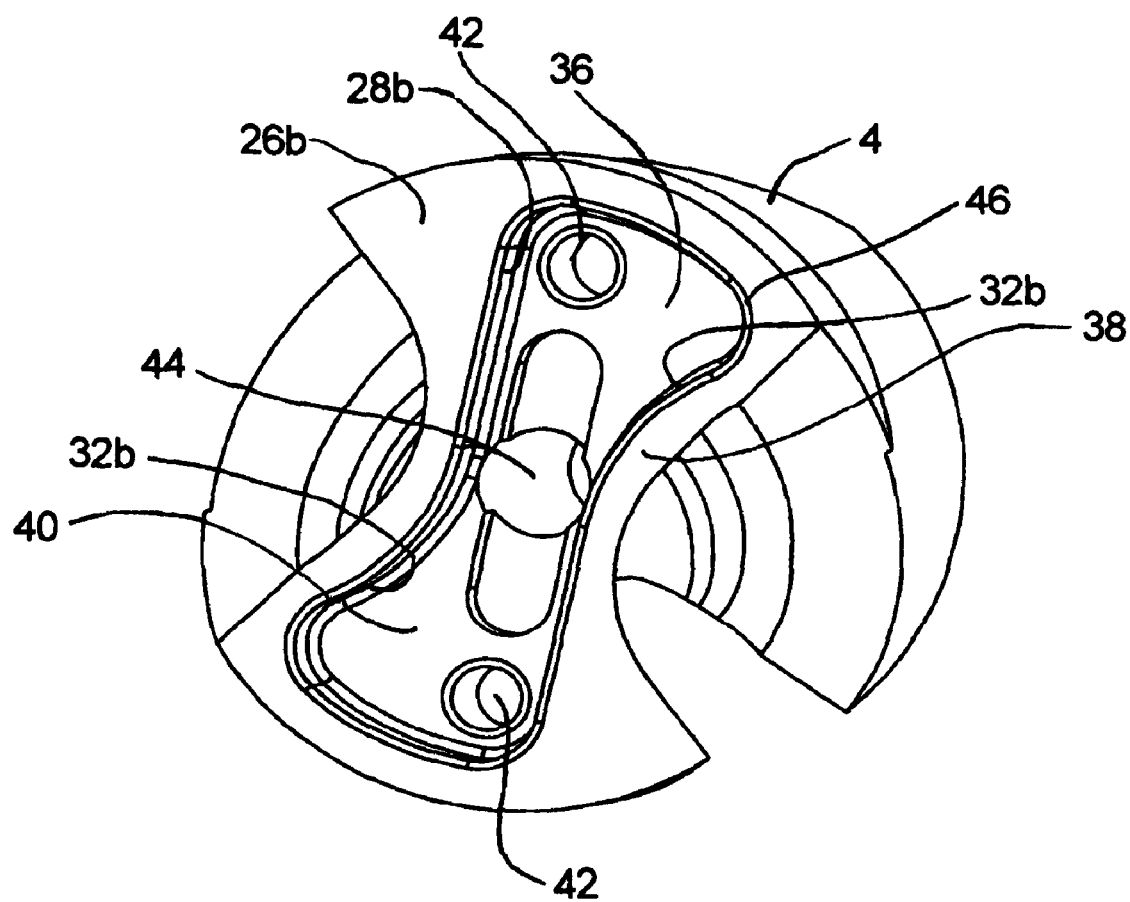

To enable a high-quality driving connector for transmission even of high torques, a driving connector as shown in FIGS. 2 and 3 is provided, in which, on the lower end face of the drilling head 6, a driving web 24 is formed as part of the base body 10, said driving web 24 extending over the drill center, its length being, however, smaller than the diameter of the drilling head 6. Therefore, the driving web 24 is completely surrounded by a first contact face 26a, which in the embodiment shown is planar and from which the driving web 24 protrudes. The driving web 24 includes a peripheral side wall 28a extending out from an end face 30. The end face 30 is plane-parallel or substantially parallel to the contact face 26a. In the embodiment shown, the side wall 28a is parallel or essentially parallel to the axial direction A.

The driving web 24 has a web width b, which from the drill center increases in direction towards each of its two lateral margin areas. As a whole, the driving web 24 includes bulb-shaped widenings in its outer end areas, so that the driving web 24 as a whole is shaped like a bone. Starting from the drill center, the side wall 28a extends along a concave line outwards in the shape of a sickle, the sickle-shaped course being formed in each case in a radial or essentially radial direction towards driving faces 32, on which torque transmission takes place. During the machining operation, the drilling tool 2 rotates in direction of rotation R about its center axis 34. Torque transmission, therefore, essentially takes place only in the radially outer areas of the side wall 28a, which form the driving faces 32 and are oriented opposite the direction of rotation R. In the other radial direction starting from the drill center, the side wall 28a has in each case an approximately straight-line course. The bulb-shaped widenings of the driving web 24 are, therefore, asymmetric in themselves. The driving web 24 as a whole possesses, however, a point symmetry relative to the center axis 34. The widening of the driving web 24, increasing in radial direction, such as in the sickle-shaped design, provide an automatic radial self-centering, so that no additional central centering pin is necessary nor provided.

In correspondence with the driving web 24, a receiving pocket 36 is formed on the end face of the drilling member 4. Said receiving pocket 36 is surrounded by a peripheral web 38 extending along the complete periphery of the receiving pocket 36, the end face of said peripheral web 38 facing towards the drilling head 6 forming at the same time a second contact face 26b, on which the first contact face 26a of the drilling head 6 rests in installed condition flatly and without gaps. The receiving pocket 36 is defined by a peripheral side wall 28b, which constitutes driving faces 32b in the sickle-shaped partial areas. The bottom of the receiving pocket 36 is formed by a pocket bottom 40, which is substantially plane-parallel to the contact face 28b. In the outer margin areas of the pocket bottom 40, tapped holes 42 are formed, into which the screws 14 for fixing the drilling head 6 can be screwed. In the central area of the pocket bottom 40, a coolant supply 44 exits, which includes a slot-shaped widening for distributing the coolant to the two coolant channels 22 of the drilling head 6.

The geometry of the receiving pocket 36 is adapted to that of the driving web 24, such that the driving web 24 engages the receiving pocket 36 with optimum fitting accuracy and with positive fit. In at least one embodiment, a press fit results during installation, i.e. the driving web 24 has at least in partial areas an overmeasure relative to the receiving pocket 36. To enable an installation of the drilling head 6, insertion bevels 46 are formed both on the driving web 24 and on the receiving pocket 36, the overmeasure being chosen, in at least one embodiment, such that there is an overmeasure only in the widened margin areas. In at least one possible embodiment, overmeasures both in the direction of rotation R and in radial direction are provided, so that the driving web is securely clamped in the receiving pocket 36. The overmeasure assists at the same time the automatic self-centering.

At least one possible embodiment of the driving web 24 described here, in connection with the receiving pocket 36, promotes reliable torque transmission even for maximally stressed drilling tools 2. The reliable torque transmission is promoted by the peripheral web 38 extending along the complete periphery, i.e. the pocket-like design of the adaptor of the driving web 24. Therefore, no resilient expansion or only a slight resilient expansion will occur, even at high torques, so that a direct and essentially immediate torque transmission is achieved even under maximum stress. At the same time, an automatic radial self-centering is achieved through the special shape in the manner of a bone, because the sickle-shaped design divides the arising torques into a radial component directed towards the drill center.

The securing of the drilling head 6 in axial direction A is effected by means of the screw joint with the screws 14. At the same time, this screwing force acting in axial direction A securely and reliably provides a plane bearing of the two contact faces 26a, 26b. The contact faces 26a, 26b rest on each other sealingly, so that no or virtually no coolant will escape. Furthermore, the gap-free bearing promotes chip evacuation.

Figure 5:
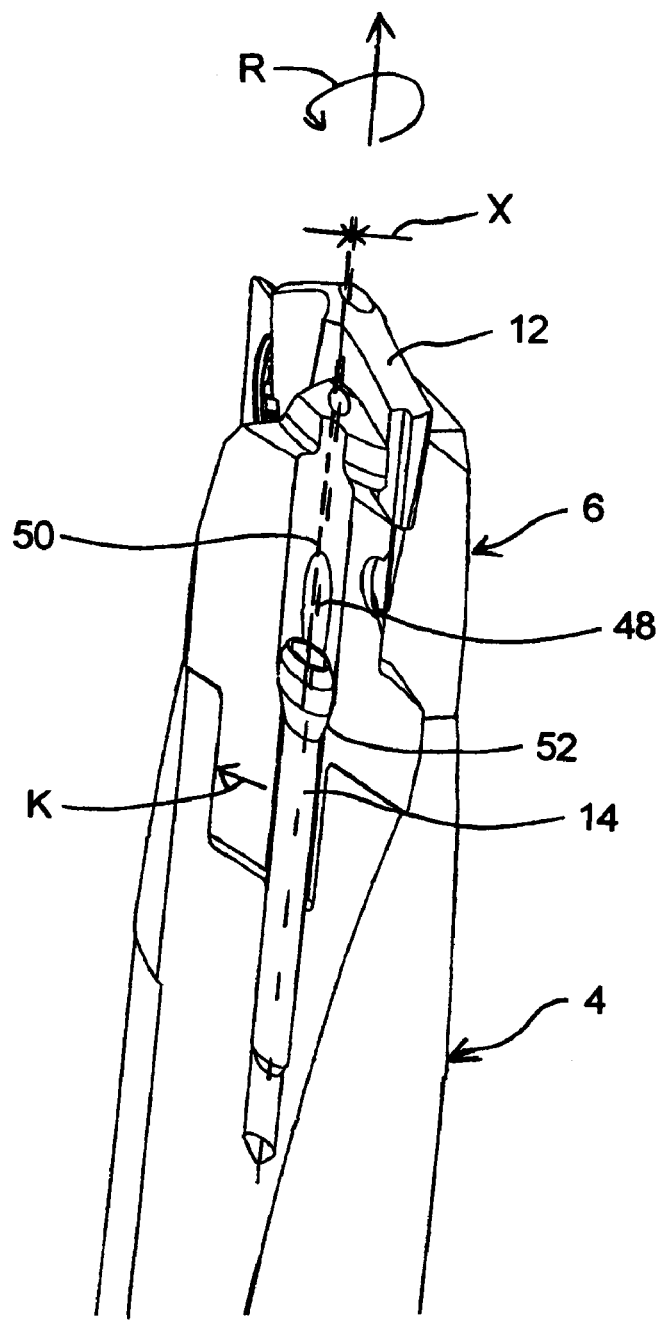
FIG. 5 is a detail of a sectional view of the drilling tool along a section in axial direction.

The screw joint is, furthermore, designed in such a way that the driving faces 32a, 32b of the driving web 24, which are in correspondence with each other, and the receiving pocket 36 are pressed against each other. For this purpose, the driving faces 32a of the driving web 24 are shifted opposite the direction of rotation R. This is achieved by an offset x of the longitudinal axis 48 of the screw relative to the longitudinal axis 50 of a screw-head rest 52, the offset x being chosen such that a force component k results, as is evident from FIG. 5.

By means of FIG. 6A to 6D, an embodiment will now be described, in which the driving web 24 forms with the receiving pocket 36 a positive locking acting in axial direction A, a kind of bayonet joint being provided for that purpose. As the formation of the bayonet joint requires a relative movement between driving web 24 and receiving pocket 36, these two parts have a sufficient play with each other. The driving web 24 is of a special shape and an upper partial area 54a thereof is formed in the manner of a rounded rectangle, viewed in cross-section, which in FIGS. 6B and 6D is represented as a hatched area. The lower partial area 54b has a shape like the one described in connection with FIG. 2, i.e., in the lower partial area 54b, the driving web 24 is provided in its margin areas with the widenings and has, therefore, as a whole, the bone-like shape with the sickle-shaped course of its side wall 28a. The outline of the upper partial area 54a is marked in FIGS. 6B, 6D by the reference number 56a, and the outline of the lower partial area 54b, by the reference number 56b (shown in dotted lines in FIG. 6D). Accordingly, the receiving pocket 36 also includes an upper and a lower partial area 58a, 58b. The outline of the upper partial area 58a is marked in FIGS. 6B, 6D by the reference number 60a, and the outline of the lower partial area 58b, by the reference number 60b (shown in dotted lines in the figures).

Figure 6A:
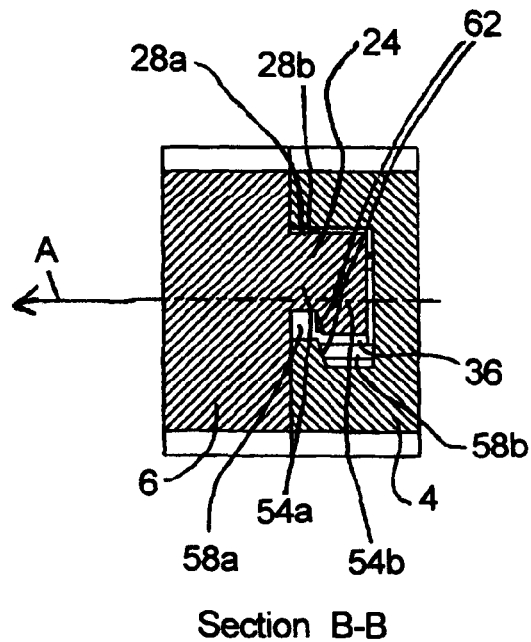
FIG. 6A-6D are representations illustrating at least one possible embodiment in which the driving web and the receiving pocket engage in partial areas in the manner of a bayonet joint, FIGS. 6A and 6B showing a section and a top view, respectively, prior to forming the bayonet joint, and FIGS. 6C and 6D showing a a section and a top view, respectively, with the bayonet joint being formed.
Figure 6B:
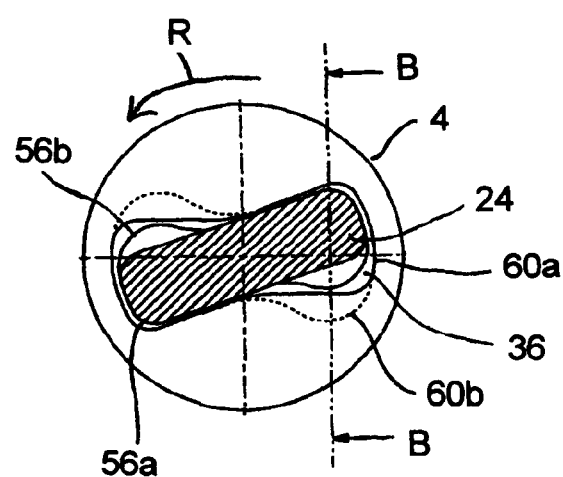
Figure 6C:
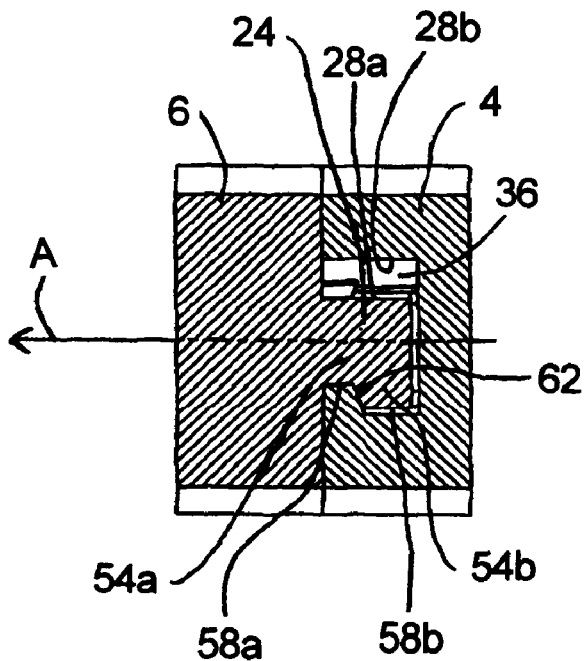
Figure 6D:
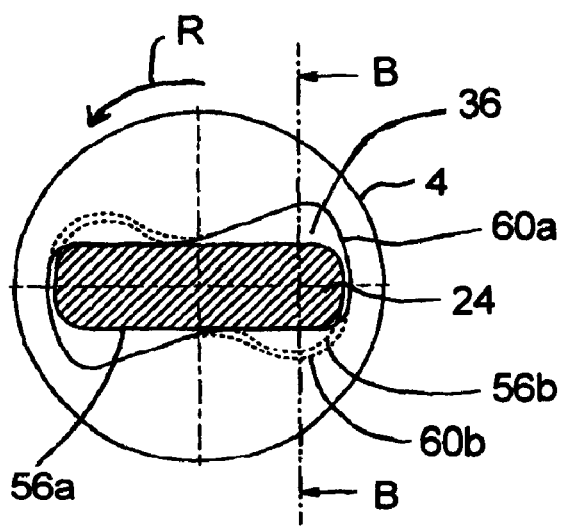

As is evident from FIGS. 6A, 6C, the side walls 28a, 28b are formed in the manner of steps in the partial area of the outer margin area, so that in assembled condition, as shown in FIG. 6C, they form a positive locking and back-grip acting in axial direction A. The step-like design of the side walls 28a, 28b includes a step face 62 oriented obliquely to the axial direction A and thus also obliquely to the pocket bottom 40. Due to this oblique or else conical step face 62, a contact pressure acting in axial direction A is exerted upon formation of the bayonet joint, so that the two contact faces 26a, 26b are pressed against each other. Due to this oblique step face 62, the joint is, therefore, as a whole, also formed in the manner of a dovetail joint.

With the variant shown in FIGS. 6A to 6D, a radial self-centering is achieved through the shape of the driving web 24 in the same way as with the driving web 24 shown in FIG. 2. At the same time, the design of the back-grip acting in axial direction A promotes through the automatic clamping an axial locking as well as a secure plane bearing, so that in this embodiment variant, the additional arrangement of a screw joint is not necessary and may be omitted. To form the joint, the drilling head 6 is inserted into the receiving pocket 36, as is evident from FIG. 6B, with a rotational offset of a few degrees, in its final orientation, and is then rotated, against the direction of rotation R, into its nominal position, shown in FIG. 6D.

FIG. 6A to 6D are simplified schematic representations. The other features described in connection with FIG. 1 to 5, such as, for example, the arrangement and design of the coolant supply as well as the special design of the drilling head 6 with the drill-point insert 12 and the indexable inserts 16, may be provided in this embodiment variant, too.

In at least one possible embodiment, the driving connector was explained by means of a driving web 24 arranged on the drilling head 6 and a receiving pocket 36 formed into the drilling member 4. Alternatively, the driving web 24 is formed on the end face of the drilling member 4 and the receiving pocket 36, on the drilling head 6.

One feature or aspect of an embodiment is believed at the time of the filing of this patent application to possibly reside broadly in a drilling tool 2 with a drilling member 4 and a tool head 6 exchangeably fixed thereon by means of a driving connector formed on the front-face end, the driving connector comprising a driving adaptor and a driving web 24 extending over the tool center and engaging the driving adaptor, characterized in that the driving adaptor is formed by a receiving pocket 36, said pocket having a peripheral web 38 for receiving the driving web 24 along its complete periphery.

Another feature or aspect of an embodiment is believed at the time of the filing of this patent application to possibly reside broadly in a drilling tool 2, characterized in that the driving web 24 is surrounded by a contact face 26a extending along the complete periphery and resting on a corresponding contact face 26b extending along the periphery of the receiving pocket 36.

Yet another feature or aspect of an embodiment is believed at the time of the filing of this patent application to possibly reside broadly in a drilling tool 2, characterized in that the web width b of the driving web 24 increases in direction towards its margin areas.

Still another feature or aspect of an embodiment is believed at the time of the filing of this patent application to possibly reside broadly in a drilling tool 2, characterized in that the driving web 24 includes a peripheral side wall 28a which in radial direction extends, at least in some areas, with a concave curvature.

A further feature or aspect of an embodiment is believed at the time of the filing of this patent application to possibly reside broadly in a drilling tool 2 according to any of the preceding claims, characterized in that the tool head 6 is fixed on the drilling member 4 by screws 14 oriented in axial direction A.

Another feature or aspect of an embodiment is believed at the time of the filing of this patent application to possibly reside broadly in a drilling tool 2, characterized in that the screws 14 are passed through margin areas of the driving web 24 and are screwed into a pocket bottom 40 of the receiving pocket 36.

Yet another feature or aspect of an embodiment is believed at the time of the filing of this patent application to possibly reside broadly in a drilling tool 2, characterized in that the screw axis 48 is offset against a drill-hole axis 50 of a drill-hole 18, through which the screw 14 is passed, such that the driving web 24 is clamped against the receiving pocket 36.

Still another feature or aspect of an embodiment is believed at the time of the filing of this patent application to possibly reside broadly in a drilling tool 2, characterized in that the driving web 24 and the receiving pocket 36 each include a peripheral side wall 28a, b, said side walls forming in a partial area a back-grip with each other.

A further feature or aspect of an embodiment is believed at the time of the filing of this patent application to possibly reside broadly in a drilling tool 2, characterized in that the driving web 24 has, at least in partial areas, an overmeasure relative to the receiving pocket 36.

Another feature or aspect of an embodiment is believed at the time of the filing of this patent application to possibly reside broadly in a drilling tool 2, characterized in that the driving web 24 and the receiving pocket 36 each include a peripheral side wall 28a, b, the side wall 28a, b of the driving web 24 and/or of the receiving pocket 36 having, at least in partial areas, in axial direction A a conical shape.

Yet another feature or aspect of an embodiment is believed at the time of the filing of this patent application to possibly reside broadly in a drilling tool 2, characterized in that the driving web 24 is of an asymmetric design.

One feature or aspect of an embodiment is believed at the time of the filing of this patent application to possibly reside broadly in a tool head 6 for a drilling tool 2 for exchangeable arrangement in a drilling member 4 with a driving web 24 arranged on the front-face end and extending over the tool center, characterized in that the driving web 24 is surrounded on its complete periphery by a contact face 26a.

Another feature or aspect of an embodiment is believed at the time of the filing of this patent application to possibly reside broadly in a tool head, characterized by a central drill-point insert 12 and cutting inserts 16 which are exchangeably arranged on both sides thereof.

Yet another feature or aspect of an embodiment is believed at the time of the filing of this patent application to possibly reside broadly in a drilling tool 2 with a drilling member 4 and a tool head 6 exchangeably fixed thereon by means of a driving connector formed on the front-face end, the driving connector comprising a driving adaptor and a oblong driving web 24 extending over the tool center and engaging the driving adaptor, the driving adaptor being formed by a receiving pocket 36, said pocket having a peripheral web 38 for receiving the driving web 24 along its complete periphery, characterized in that the web width b of the oblong driving web 24, starting out from the tool center, increases in direction towards its two margin areas opposite each other.

Still another feature or aspect of an embodiment is believed at the time of the filing of this patent application to possibly reside broadly in a drilling tool 2, characterized in that the driving web 24 is surrounded by a contact face 26a extending along the complete periphery and resting on a corresponding contact face 26b extending along the periphery of the receiving pocket 36.

A further feature or aspect of an embodiment is believed at the time of the filing of this patent application to possibly reside broadly in a drilling tool 2, characterized in that the driving web 24 includes a peripheral side wall 28a which in radial direction extends, at least in some areas, with a concave curvature.

Another feature or aspect of an embodiment is believed at the time of the filing of this patent application to possibly reside broadly in a drilling tool 2, characterized in that the tool head 6 is fixed on the drilling member 4 by screws 14 oriented in axial direction A.

Yet another feature or aspect of an embodiment is believed at the time of the filing of this patent application to possibly reside broadly in a drilling tool 2, characterized in that the screws 14 are passed through margin areas of the driving web 24 and are screwed into a pocket bottom 40 of the receiving pocket 36.

Still another feature or aspect of an embodiment is believed at the time of the filing of this patent application to possibly reside broadly in a drilling tool 2, characterized in that the screw axis 48 is offset against a drill-hole axis 50 of a drill-hole 18, through which the screw 14 is passed, such that the driving web 24 is clamped against the receiving pocket 36.

A further feature or aspect of an embodiment is believed at the time of the filing of this patent application to possibly reside broadly in a drilling tool 2, characterized in that the driving web 24 and the receiving pocket 36 each include a peripheral side wall 28a, b, said side walls forming in a partial area a back-grip with each other.

Another feature or aspect of an embodiment is believed at the time of the filing of this patent application to possibly reside broadly in a drilling tool 2, characterized in that the driving web 24 has, at least in partial areas, an overmeasure relative to the receiving pocket 36.

Yet another feature or aspect of an embodiment is believed at the time of the filing of this patent application to possibly reside broadly in a drilling tool 2, characterized in that the driving web 24 and the receiving pocket 36 each include a peripheral side wall 28a, b, the side wall 28a, b of the driving web 24 and/or of the receiving pocket 36 having, at least in partial areas, in axial direction A a conical shape.

One feature or aspect of an embodiment is believed at the time of the filing of this patent application to possibly reside broadly in a drilling tool 2, characterized in that the driving web 24 is of an asymmetric design.

Another feature or aspect of an embodiment is believed at the time of the filing of this patent application to possibly reside broadly in a tool head 6 for a drilling tool 2 for exchangeable arrangement in a drilling member 4 with an oblong driving web 24 arranged on the front-face end and extending over the tool center, the driving web 24 being surrounded on its complete periphery by a contact face 26a, characterized in that the web width b of the oblong driving web 24, starting out from the tool center, increases in direction towards its two margin areas opposite each other.

Yet another feature or aspect of an embodiment is believed at the time of the filing of this patent application to possibly reside broadly in a tool head, characterized a central drill-point insert 12 and cutting inserts 16 which are exchangeably arranged on both sides thereof.

One feature or aspect of an embodiment is believed at the time of the filing of this patent application to possibly reside broadly in a drill comprising: a tool body comprising a fluted portion and a shank portion; said fluted portion having a first end adjacent said shank portion and a second end opposite said first end; a tool head portion comprising a cutting tip and at least one cutting edge; said tool head portion being removably connected to said second end of said fluted portion; said fluted portion comprising a receiving pocket disposed in said second end; said tool head portion comprising a driving projection being configured to be inserted into said receiving pocket; said driving projection having an elongated, curvilinear, dog-bone shape; said receiving pocket having an elongated, curvilinear, dog-bone shape corresponding to the shape of said driving projection; said driving projection comprising a first end portion, a second end portion, and a central portion disposed between and to connect said first end portion and said second end portion; and said first end portion and said second end portion each having a width that is substantially greater than a width of said central portion.

Another feature or aspect of an embodiment is believed at the time of the filing of this patent application to possibly reside broadly in the drill, wherein: said tool head portion comprises a contact face disposed to completely surround said driving projection; said second end of said fluted portion comprises a contact face disposed to completely surround said receiving pocket; and said contact face of said tool head portion corresponds to and is in contact with said contact face of said second end of said fluted portion.

Yet another feature or aspect of an embodiment is believed at the time of the filing of this patent application to possibly reside broadly in the drill, wherein: said driving projection comprises a peripheral side wall; and at least a portion of said peripheral sidewall extending in a substantially radial direction from said central portion has a concave curvature.

Still another feature or aspect of an embodiment is believed at the time of the filing of this patent application to possibly reside broadly in the drill, wherein said tool head portion is fixed on said tool body portion by screws oriented in an axial direction.

A further feature or aspect of an embodiment is believed at the time of the filing of this patent application to possibly reside broadly in the drill, wherein: said screws are passed through said first and second end portions of said driving projection; and said tool body portion comprises receiving holes disposed in said receiving pocket; and said screws are screwed into said receiving holes.

Another feature or aspect of an embodiment is believed at the time of the filing of this patent application to possibly reside broadly in the drill, wherein: said tool head portion comprises through holes through which said screws are passed; each of said through holes has a central longitudinal axis; each of said screws has a longitudinal screw axis; said longitudinal screw axis of each of said screws is offset against said central longitudinal axis of its corresponding through hole to clamp said driving projection against said receiving pocket.

Yet another feature or aspect of an embodiment is believed at the time of the filing of this patent application to possibly reside broadly in the drill, wherein: said receiving pocket comprises a peripheral side wall corresponding to said peripheral side wall of said driving projection; at least a portion of at least one of: said peripheral side wall of said receiving pocket and said peripheral side wall of said driving projection has a conical shape; and said driving projection has an asymmetric design.

Still another feature or aspect of an embodiment is believed at the time of the filing of this patent application to possibly reside broadly in the drill, wherein: said receiving pocket comprises a peripheral side wall corresponding to said peripheral side wall of said driving projection; at least a portion of said peripheral side wall of said receiving pocket has a stepped, angled, or conical profile forming an undercut portion; at least a portion of said peripheral side wall of said driving projection has a stepped, angled, or conical profile forming a projecting portion; said projecting portion of said driving projection is inserted into said receiving pocket under said undercut portion to engage said undercut portion and retain said driving projection in said receiving pocket; said driving projection has an asymmetric design.

One feature or aspect of an embodiment is believed at the time of the filing of this patent application to possibly reside broadly in a drill assembly comprising: a tool body comprising a fluted portion and a shank portion; said fluted portion having a first end adjacent said shank portion and a second end opposite said first end; at least two tool head portions, each comprising a cutting tip and at least one cutting edge; each of said tool head portions being configured to be removably connected to said second end of said fluted portion; said fluted portion comprising a receiving pocket disposed in said second end; each of said tool head portions comprising a driving projection being configured to be inserted into said receiving pocket; said driving projection having an elongated, curvilinear, dog-bone shape; said driving projection comprising a first end portion, a second end portion, and a central portion disposed between and to connect said first end portion and said second end portion; and said first end portion and said second end portion each having a width that is substantially greater than a width of said central portion.

Another feature or aspect of an embodiment is believed at the time of the filing of this patent application to possibly reside broadly in the drill assembly, wherein: said tool head portion comprises a contact face disposed to completely surround said driving projection; said second end of said fluted portion comprises a contact face disposed to completely surround said receiving pocket; and said contact face of said tool head portion corresponds to and is configured to be disposed in contact with said contact face of said second end of said fluted portion.

Yet another feature or aspect of an embodiment is believed at the time of the filing of this patent application to possibly reside broadly in the drill assembly, wherein: said driving projection comprises a peripheral side wall; and at least a portion of said peripheral sidewall extending in a substantially radial direction from said central portion has a concave curvature.

Still another feature or aspect of an embodiment is believed at the time of the filing of this patent application to possibly reside broadly in the drill assembly, wherein said tool head portion is configured to be fixed on said tool body portion by screws oriented in an axial direction.

A further feature or aspect of an embodiment is believed at the time of the filing of this patent application to possibly reside broadly in the drill assembly, wherein: said screws are configured to be passed through said first and second end portions of said driving projection; and said tool body portion comprises receiving holes disposed in said receiving pocket; and said screws are configured to be screwed into said receiving holes.

Another feature or aspect of an embodiment is believed at the time of the filing of this patent application to possibly reside broadly in the drill assembly, wherein: said tool head portion comprises through holes through which said screws are configured to be passed; each of said through holes has a central longitudinal axis; each of said screws has a longitudinal screw axis; said longitudinal screw axis of each of said screws is configured to be offset against said central longitudinal axis of its corresponding through hole to clamp said driving projection against said receiving pocket.

Yet another feature or aspect of an embodiment is believed at the time of the filing of this patent application to possibly reside broadly in the drill assembly, wherein: said receiving pocket comprises a peripheral side wall corresponding to said peripheral side wall of said driving projection; at least a portion of at least one of: said peripheral side wall of said receiving pocket and said peripheral side wall of said driving projection has a conical shape; and said driving projection has an asymmetric design.

Still another feature or aspect of an embodiment is believed at the time of the filing of this patent application to possibly reside broadly in the drill assembly, wherein: said receiving pocket comprises a peripheral side wall corresponding to said peripheral side wall of said driving projection; at least a portion of said peripheral side wall of said receiving pocket has a stepped, angled, or conical profile forming an undercut portion; at least a portion of said peripheral side wall of said driving projection has a stepped, angled, or conical profile forming a projecting portion; said projecting portion of said driving projection is configured to be inserted into said receiving pocket under said undercut portion to engage said undercut portion and retain said driving projection in said receiving pocket; and said driving projection has an asymmetric design.

One feature or aspect of an embodiment is believed at the time of the filing of this patent application to possibly reside broadly in a removable tool head for use in a cutting tool, said tool head comprising: a cutting tip and at least one cutting edge; a driving projection being configured to be inserted into a corresponding receiving pocket of a tool body; said driving projection having an elongated, curvilinear, dog-bone shape; said driving projection comprising a first end portion, a second end portion, and a central portion disposed between and to connect said first end portion and said second end portion; and said first end portion and said second end portion each having a width that is substantially greater than a width of said central portion.

Another feature or aspect of an embodiment is believed at the time of the filing of this patent application to possibly reside broadly in the tool head, wherein: said cutting tip comprises a removable cutting tip insert; said tool head comprises at least one cutting insert; said at least one cutting edge is disposed on said at least one cutting insert; said tool head comprises a contact face disposed to completely surround said driving projection; and said contact face corresponds to and is configured to be disposed in contact with a contact face of an end of a tool body.

Yet another feature or aspect of an embodiment is believed at the time of the filing of this patent application to possibly reside broadly in the tool head, wherein: said driving projection comprises a peripheral side wall; at least a portion of said peripheral sidewall extending in a substantially radial direction from said central portion has a concave curvature; said tool head comprises through holes; said tool head is configured to be fixed on a tool body by screws oriented in an axial direction and passed through said through holes in said tool head and said first and second end portions of said driving projection; at least a portion of said peripheral side wall of said driving projection has a conical shape; and said driving projection has an asymmetric design.

Still another feature or aspect of an embodiment is believed at the time of the filing of this patent application to possibly reside broadly in the tool head, wherein: at least a portion of said peripheral side wall of said driving projection has a stepped, angled, or conical profile forming a projecting portion; said projecting portion of said driving projection is configured to be inserted into an undercut portion of a receiving pocket of a tool body to engage said undercut portion and retain said driving projection in a receiving pocket; and said driving projection has an asymmetric design.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that any or all the examples of patents, published patent applications, and other documents which are included in this application and including those which are referred to in paragraphs which state "Some examples of . . . which may possibly be used in at least one possible embodiment of the present application . . . " may possibly not be used or useable in any one or more or any embodiments of the application.

The sentence immediately above relates to patents, published patent applications and other documents either incorporated by reference or not incorporated by reference.

All of the patents, patent applications or patent publications, which were cited in the International Search Report dated Aug. 17, 2007, and/or cited elsewhere are hereby incorporated by reference as if set forth in their entirety herein as follows: U.S. Pat. No. 2,158,120; WO 96/11079; EP 0 947 662; EP 1 533 061; WO 2004/087355; U.S. Pat. No. 3 595 327; WO 00/09282; GB 2 123 523; WO 03/097282; EP 0 742 065; EP 0 441 302; and WO 02/090027.

The purpose of incorporating U.S. patents, Foreign patents, publications, etc. is solely to provide additional information relating to features of one or more embodiments, which information may not be completely disclosed in the wording in the pages of this application.

The corresponding foreign and international patent publication applications, namely, Federal Republic of Germany Patent Application No. 10 2006 012 382.4, filed on Mar. 17, 2006, having inventors Horst Manfred JAEGER; Peter Karl MERGENTHALER; and Berthold Heinrich ZEUG, and DE-OS10 2006 012 382.4 and DE-PS10 2006 012 382.4, and International Application No. PCT/EP2007/002313, filed on Mar. 16, 2007, having WIPO Publication No. WO 2007/107294 and inventors Horst Manfred JAEGER; Peter Karl MERGENTHALER; and Berthold Heinrich ZEUG, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/EP2007/002313 and German Patent Application 10 2006 012 382.4 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/002313 and DE 10 2006 012 382.4 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A drill comprising:
    a tool body comprising a fluted portion and a shank portion, said fluted portion having a first end adjacent said shank portion and a second end opposite said first end;
    a tool head portion comprising a cutting tip and at least one cutting edge, said tool head portion being removably connected to said second end of said fluted portion;
    said fluted portion comprising a receiving pocket disposed in said second end and defined by a peripheral side wall extending about the periphery of the receiving pocket, at least a portion of said peripheral side wall having a stepped, angled, or conical profile forming an undercut portion;
    said second end of said fluted portion comprising a contact face disposed to completely surround said receiving pocket;
    said tool head portion comprising a driving projection being configured to be inserted into said receiving pocket and a contact face disposed to completely surround said driving projection and contact said contact face of said second end of said fluted portion;
    said driving projection having an elongated, curvilinear, dog-bone shape;
    said driving projection comprising a peripheral side wall, at least a portion of which having a stepped, angled, or conical profile forming a projecting portion;
    said receiving pocket having an elongated, curvilinear, dog-bone shape corresponding to the shape of said driving projection;
    said driving projection comprising a first end portion, a second end portion, and a central portion disposed between and to connect said first end portion and said second end portion;
    said first end portion and said second end portion each having a width that is substantially greater than a width of said central portion; and
    said projecting portion of said driving projection being inserted into said receiving pocket under said undercut portion to engage said undercut portion and retain said driving projection in said receiving pocket.

2. The drill according to claim 1, wherein said tool head portion is fixed on said tool body portion by screws oriented in an axial direction.

3. The drill according to claim 2, wherein:
    said screws are passed through said first and second end portions of said driving projection;
    said tool body portion comprises receiving holes disposed in said receiving pocket; and
    said screws are screwed into said receiving holes.

4. The drill according to claim 3, wherein:
    said tool head portion comprises through holes through which said screws are passed;
    each of said through holes has a central longitudinal axis;
    each of said screws has a longitudinal screw axis;

said longitudinal screw axis of each of said screws is offset against said central longitudinal axis of its corresponding through hole to clamp said driving projection against said receiving pocket.

5. The drill according to claim 4, wherein:
said receiving pocket comprises a peripheral side wall corresponding to said peripheral side wall of said driving projection;
at least a portion of at least one of: said peripheral side wall of said receiving pocket and said peripheral side wall of said driving projection has a conical shape; and
said driving projection has an asymmetric design.

6. The drill according to claim 1, wherein
said driving projection has an asymmetric design.

7. A drill assembly comprising:
a tool body comprising a fluted portion and a shank portion, said fluted portion having a first end adjacent said shank portion and a second end opposite said first end;
at least two tool head portions, each comprising a cutting tip and at least one cutting edge, each of said tool head portions being configured to be removably connected to said second end of said fluted portion;
said fluted portion comprising a receiving pocket disposed in said second end and defined by a peripheral side wall extending about the periphery of the receiving pocket and a contact face disposed to completely surround the receiving pocket, at least a portion of said peripheral side wall having a stepped, angled, or conical profile forming an undercut portion;
each of said tool head portions comprising a driving projection being configured to be inserted into said receiving pocket and a contact face disposed to completely surround said driving projection, said contact face of said tool head portion corresponding to and being configured to be disposed in contact with said contact face of said second end of said fluted portion;
said driving projection having an elongated, curvilinear, dog-bone shape;
said driving projection comprising a first end portion, a second end portion, a central portion disposed between and to connect said first end portion and said second end portion, and a peripheral side wall, at least a portion of said peripheral side wall of said driving projection having a stepped, angled, or conical profile forming a projecting portion;
said first end portion and said second end portion of said driving projection each having a width that is substantially greater than a width of said central portion; and
said projecting portion of said driving projection is configured to be inserted into said receiving pocket under said undercut portion to engage said undercut portion and retain said driving projection in said receiving pocket.

8. The drilling assembly according to claim 7, wherein
at least a portion of said peripheral sidewall extending in a substantially radial direction from said central portion has a concave curvature.

9. The drilling assembly according to claim 8, wherein said tool head portion is configured to be fixed on said tool body portion by screws oriented in an axial direction.

10. The drilling assembly according to claim 9, wherein:
said screws are configured to be passed through said first and second end portions of said driving projection;
said tool body portion comprises receiving holes disposed in said receiving pocket; and
said screws are configured to be screwed into said receiving holes.

11. The drilling assembly according to claim 10, wherein:
said tool head portion comprises through holes through which said screws are configured to be passed;
each of said through holes has a central longitudinal axis;
each of said screws has a longitudinal screw axis; and
said longitudinal screw axis of each of said screws is configured to be offset against said central longitudinal axis of its corresponding through hole to clamp said driving projection against said receiving pocket.

12. The drilling assembly according to claim 11, wherein:
said receiving pocket comprises a peripheral side wall corresponding to said peripheral side wall of said driving projection;
at least a portion of at least one of: said peripheral side wall of said receiving pocket and said peripheral side wall of said driving projection has a conical shape; and
said driving projection has an asymmetric design.

13. The drilling assembly according to claim 9, wherein
said driving projection has an asymmetric design.

14. A removable tool head for use in a cutting tool, said tool head comprising:
a cutting tip including a removable cutting tip insert;
at least one cutting insert;
at least one cutting edge disposed on said at least one cutting insert;
a driving projection being configured to be inserted into a corresponding receiving pocket of a tool body;
a contact face disposed to completely surround said driving projection, said contact face being configured to be disposed in contact with a contact face of an end of a tool body;
said driving projection having an elongated, curvilinear, dog-bone shape;
said driving projection comprising a first end portion, a second end portion, and a central portion disposed between and to connect said first end portion and said second end portion, and
said first end portion and said second end portion each having a width that is substantially greater than a width of said central portion;
said driving projection comprising a peripheral side wall, at least a portion of which having a stepped, angled, or conical profile forming a projecting portion; and
said projecting portion of said driving projection being configured to be inserted into an undercut portion of a receiving pocket of a tool body to engage said undercut portion and retain said driving projection in a receiving pocket,
wherein the central portion is disposed between, and is generally defined by, two sickle-shaped wall portions extending between the first end portion and the second end portion, and wherein at least a portion of each sickle-shaped wall portion is structured to be driven by a corresponding portion of the pocket of the tool body in which the driving projection is inserted.

15. The tool head according to claim 14, wherein:
at least a portion of said peripheral sidewall extending in a substantially radial direction from said central portion has a concave curvature;
said tool head comprises through holes;
said tool head is configured to be fixed on a tool body by screws oriented in an axial direction and passed through said through holes in said tool head and said first and second end portions of said driving projection; and
at least a portion of said peripheral side wall of said driving projection has a conical shape.

16. The tool head according to claim 14,
said driving projection has an asymmetric design.

* * * * *